US012674413B2

(12) United States Patent
Sobanski

(10) Patent No.: US 12,674,413 B2
(45) Date of Patent: Jul. 7, 2026

(54) WATER COOLED EXHAUST DUCT

(71) Applicant: Raytheon Technologies Corporation, Farmington, CT (US)

(72) Inventor: Jon Erik Sobanski, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 397 days.

(21) Appl. No.: 18/331,477

(22) Filed: Jun. 8, 2023

(65) Prior Publication Data

US 2024/0410313 A1     Dec. 12, 2024

(51) Int. Cl.
| *F02C 3/30* | (2006.01) |
| *F01D 25/12* | (2006.01) |
| *F02C 7/143* | (2006.01) |
| *F02K 1/82* | (2006.01) |

(52) U.S. Cl.
CPC ............... *F02C 3/30* (2013.01); *F01D 25/12* (2013.01); *F02C 7/1435* (2013.01); *F02K 1/822* (2013.01)

(58) Field of Classification Search
CPC .. F02C 3/30; F02C 7/1435; F02C 7/16; F02C 7/12; F05D 2260/205; F05D 2260/211; F05D 2260/212; F05D 2260/232; F01D 25/12; F01D 25/14; F01D 25/32; F02K 1/822
See application file for complete search history.

(56) References Cited

U.S. PATENT DOCUMENTS

| 6,293,086 | B1 * | 9/2001 | Reynolds .................. | F02C 6/18 |
| | | | | 60/39.55 |
| 8,316,631 | B2 | 11/2012 | Miller et al. | |
| 11,530,635 | B2 | 12/2022 | Kupratis et al. | |
| 11,815,030 | B1 * | 11/2023 | Owoeye .................. | F02K 1/822 |
| 11,905,884 | B1 * | 2/2024 | Dindar ...................... | F02C 3/22 |
| 2004/0060277 | A1 * | 4/2004 | Hatamiya ............... | F01D 25/32 |
| | | | | 60/39.53 |
| 2021/0207500 | A1 | 7/2021 | Klingels et al. | |
| 2021/0262383 | A1 * | 8/2021 | Uechi ...................... | F02C 6/04 |

FOREIGN PATENT DOCUMENTS

| DE | 102021202602 A1 | 2/2022 |
| RU | 2229030 C2 | 5/2004 |

OTHER PUBLICATIONS

Extended European Search Report for European Application No. 24181069.6 mailed Oct. 24, 2024.

* cited by examiner

*Primary Examiner* — Andrew H Nguyen
(74) *Attorney, Agent, or Firm* — Carlson, Gaskey & Olds, P.C.

(57) ABSTRACT

A turbine engine assembly includes a condenser where water is extracted from the exhaust gas flow and an evaporator system where thermal energy from the exhaust gas flow is utilized to generate a steam flow from at least a portion of water that is extracted by the condenser for injection into the core flow path. A duct for the exhaust gas flow includes a cooling passage for a flow of water that accepts heat from the exhaust gas flow to cool the duct.

15 Claims, 3 Drawing Sheets

WATER COOLED EXHAUST DUCT

RESEARCH OR DEVELOPMENT

This invention was made with Government support under Contract DE-AR0001561 awarded by the United States Department of Energy, Office of ARPA-E. The Government has certain rights in this invention.

TECHNICAL FIELD

The present disclosure relates generally to an aircraft propulsion system that includes a steam generation system transforming recovered water into a steam flow injected into a core flow.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate an exhaust gas flow. Steam injection can provide improved propulsive efficiencies. Water recovered from the exhaust gas flow may be transformed into steam using thermal energy from the exhaust gas flow. Water recovery and steam generation utilize ducting and heat exchangers exposed to the high temperatures of the exhaust gas. Exposure to high temperatures may limit material and structural features that increase cost and complexity.

SUMMARY

A turbine engine assembly according to one example disclosed embodiment includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, a condenser where water is extracted from the exhaust gas flow, an evaporator system where thermal energy from the exhaust gas flow is utilized to generate a steam flow from at least a portion of water that is extracted by the condenser for injection into the core flow path, and a duct system that includes a duct that defines a pathway for the exhaust gas flow and a cooling passage for a flow of water that accepts heat from the exhaust gas flow to cool the duct.

In a further embodiment of the foregoing turbine engine assembly, the passage includes an inlet that receives the flow of water from a water source and an outlet for communicating a heated water flow from the passage to the evaporator system.

In a further embodiment of any of the foregoing turbine engine assemblies, the duct includes an inner wall that is spaced radially apart from an outer wall and the cooling passage is at least partially defined within a radial space between the inner wall and the outer wall.

In a further embodiment of any of the foregoing turbine engine assemblies, the passage includes at least one conduit that is in thermal contact with the duct.

In a further embodiment of any of the foregoing turbine engine assemblies, the pathway is defined by the duct that extends between the turbine section and the evaporator system.

In a further embodiment of any of the foregoing turbine engine assemblies, the inlet and the outlet of the cooling passage is arranged such that the flow of water flows in the same direction as the exhaust gas flow between the turbine section and the evaporator system.

In a further embodiment of any of the foregoing turbine engine assemblies, the inlet and the outlet of the cooling passage is arranged such that the flow of water flows counter to the exhaust gas flow between the turbine section and the evaporator system.

In a further embodiment of any of the foregoing, the turbine engine assembly further includes a control valve that is configured to control the flow of water into the cooling passage and a controller that is programmed to operate the control valve to maintain the duct within a predefined temperature range.

In a further embodiment of any of the foregoing, the turbine engine assembly further includes a fuel system that is configured to provide a non-carbon-based fuel to the combustor section.

In a further embodiment of any of the foregoing, the turbine engine assembly further includes an intercooling system where a flow of water is utilized for cooling a portion of the compressed inlet flow.

An aircraft propulsion system according to another example disclosed embodiment includes, among other possible things, a core engine section that defines a core flow path where an inlet airflow is compressed, mixed with fuel and ignited to generate an exhaust gas flow that is communicated through a core flow path, a condenser where water is extracted from the exhaust gas flow, an evaporator system where thermal energy from the exhaust gas flow is utilized to generate a steam flow for injection into the core flow path, a duct system that includes a duct that defines a pathway for the exhaust gas flow between the core engine and the evaporator system and a cooling passage for a flow of water that accepts heat from the exhaust gas flow to cool the duct, the cooling passage includes an inlet that receives the flow of water from a water source and an outlet for communicating a heated water flow to the evaporator system, a control valve that is configured to control the flow of water into the cooling passage, and a controller programmed to operate the control valve to maintain the duct within a predefined temperature range.

In a further embodiment of the foregoing aircraft propulsion system, the duct includes an inner wall that is spaced radially apart from an outer wall and the cooling passage is at least partially defined within a radial space between the inner wall and the outer wall.

In a further embodiment of any of the foregoing aircraft propulsion systems, the passage includes at least one conduit that is in thermal contact with the duct.

In a further embodiment of any of the foregoing aircraft propulsion systems, the inlet and the outlet of the cooling passage is arranged such that the flow of water flows in the same direction as the exhaust gas flow between the core engine section and the evaporator system.

In a further embodiment of any of the foregoing aircraft propulsion systems, the inlet and the outlet of the cooling passage is arranged such that the flow of water flows counter to the exhaust gas flow between the core engine section and the evaporator system.

In a further embodiment of any of the foregoing, the aircraft propulsion system further includes a fuel system that is configured to provide a non-carbon-based fuel to the core engine section.

A method of operating a gas turbine engine, the method according to another example disclosed embodiment includes, among other possible things, generating an exhaust gas flow that is communicated through a core flow path, expanding the gas flow through a turbine section to generate a mechanical power output, routing the exhaust gas flow through a duct that defines a pathway for the exhaust gas flow between the turbine section and an evaporator system, extracting water from the exhaust gas flow in a condenser, controlling a temperature of the duct between the turbine section and the evaporator by transferring heat from the exhaust gas flow into a flow of water that is in thermal communication with the duct to generate a heated flow of water, and generating a steam flow by vaporizing the heating flow of water with heat from the exhaust gas flow in the evaporator system.

In a further embodiment of the foregoing, the method further includes monitoring a temperature of the duct and controlling a flow of water through a cooling passage that is in thermal communication with the duct to maintain the duct within a predefined temperature range.

In a further embodiment of the foregoing, the method further includes directing the flow of water through the cooling passage in a direction that is counter to a direction of the exhaust gas flow.

In a further embodiment of the foregoing, the method further includes directing the flow of water through the cooling passage in the same direction as the exhaust gas flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figures 1, 2, 3:
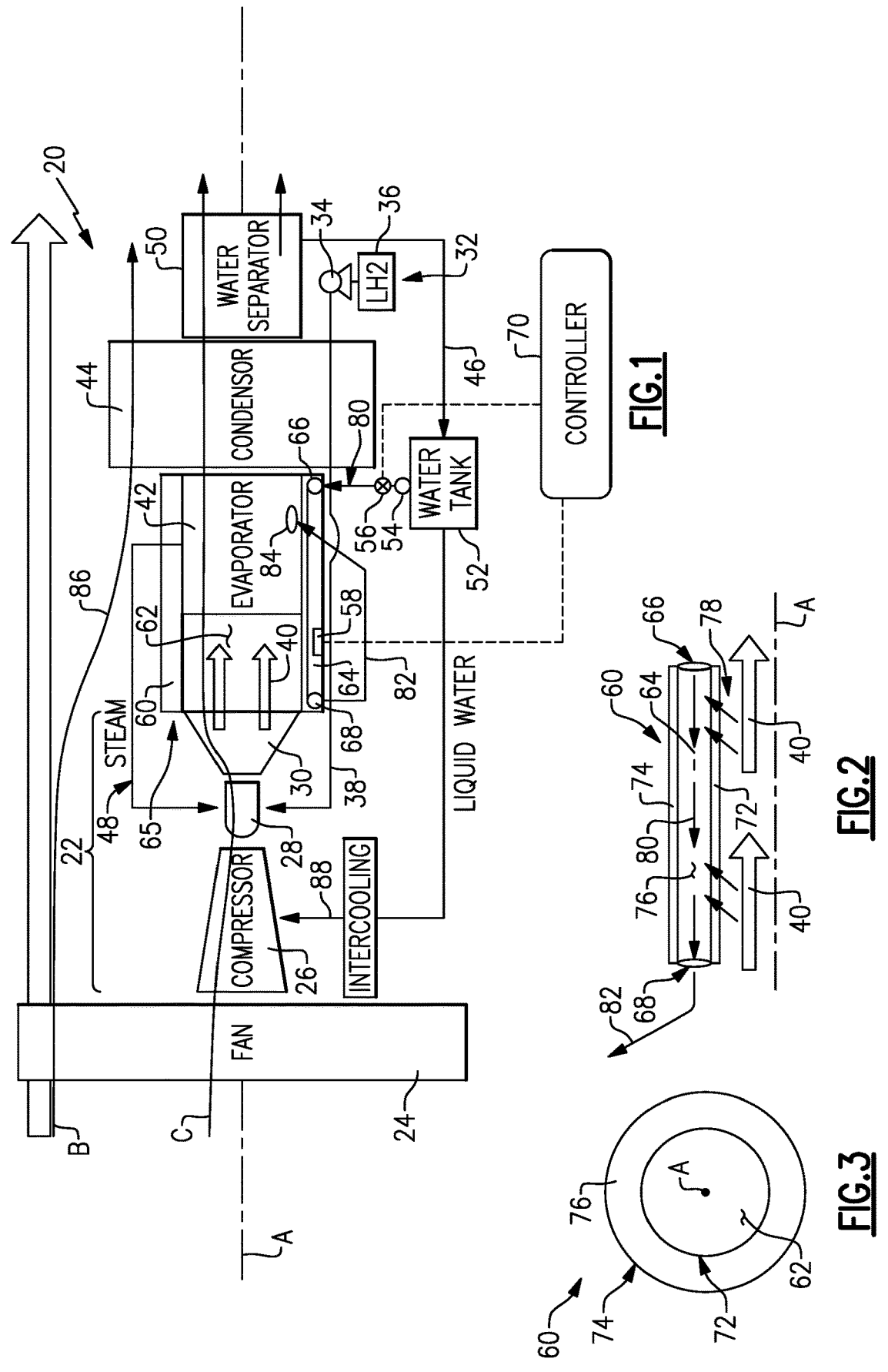
FIG. 1 is a schematic view of an example aircraft propulsion system embodiment.
FIG. 2 is a schematic cross-sectional view of an example cooling flow passage within an exhaust gas flow duct.
FIG. 3 is a schematic axial cross-section of the example cooling flow passage and exhaust gas flow duct.

FIG. 1 schematically illustrates an example propulsion system 20 that includes a duct system 65 with a duct 60 that defines a pathway 62 for exhaust gas flows from a turbine section 30 to an evaporator system 42. The duct system 65 includes a cooling passage 64 for a cooling water flow 80 to cool the duct 60. The cooling water flow 80 is utilized to maintain temperatures within a predefined temperature range that limits thermal expansion and corresponds with material capabilities of the duct 60. Moreover, heat energy input into the cooling water flow 80 is recovered by communicating an output heated water flow 82 to the evaporator system 42 to aid in the generation of a steam flow 48.

The example propulsion system 20 includes a fan section 24 and a core engine section 22. The core engine section 22 includes a compressor section 26, a combustor section 28 and the turbine section 30 disposed along an engine longitudinal axis A. The fan section 24 drives inlet airflow along a bypass flow path B, while the compressor section 26 draws air in along a core flow path C. The inlet airflow is compressed and communicated to the combustor section 28 where the compressed core airflow is mixed with a fuel flow 38 and ignited to generate the exhaust gas flow 40. The exhaust gas flow 40 expands through the turbine section 30 where energy is extracted to generate a mechanical power output utilized to drive the fan section 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 32 including at least a fuel tank 36 and a fuel pump 34 to provide the fuel flow 38 to the combustor 28. The example fuel system 32 is configured to provide a hydrogen-based fuel such as a liquid hydrogen ($LH_2$). Although hydrogen is disclosed by way of example, other non-carbon-based fuels could be utilized and are within the contemplation of this disclosure. Moreover, the disclosed features may also be beneficial in an engine configured to operate with traditional carbon fuels and/or biofuels, such as sustainable aviation fuel.

An evaporator system 42 and condenser 44 are disposed downstream of the turbine section 30 and receive the exhaust gas flow 40. The evaporator system 42 utilizes thermal energy from the exhaust gas flow 40 to generate a steam flow 48 from a water flow 46 extracted by the condenser 44 and separated from the gas flow in a water separator 50. The condenser 44 cools the exhaust gas flow 40 to extract water that is separated from the gas in the water separator 50 and gathered in a tank 52. A pump 54 pressurizes water for communication from the water tank 52. In one disclosed example embodiment, a portion of the fuel flow 38 is utilized as a heat sink to cool the exhaust gas flow 40 in the condenser 44. In another example embodiment, a cooling ram air flow 86 is used as the cold sink. Other cold sink flows may be utilized to cool the exhaust gas flow 40 within the condenser 44 and are within the contemplation and scope of this disclosure.

Water recovered with the condenser 44 may also be provided as an intercooling water flow 88 to the compressor section 26. The water flow 88 is injected into a location within the compressor section 26 to cool the core flow and thereby increase mass flow. The increased mass flow improves compressor operating efficiencies. The example intercooling water flow 88 is shown schematically and may be injected at any location within the compressor section 26 or upstream of the combustor 28.

The steam flow 48 from the evaporator 42 is injected into the core flow path at or upstream of the combustor 28 and increases mass flow through the turbine section 30 and thereby increase engine power and efficiency. The propulsion system 20 has an increased power output from the injected steam 48 due to an increasing mass flow through the turbine section 30 without a corresponding increase in work from the compressor section 26. Although the steam flow 48 is shown as being injected into the combustor 28, the steam flow 48 may be injected at other locations along the core flow path C and remain within the contemplation and scope of this disclosure.

The condenser 44 and the evaporator system 42 are heat exchangers that are exposed to the high temperatures of the exhaust gas flow 40. The duct 60 defines the pathway 62 between the turbine section 30 and the evaporator system 42 for the high temperature exhaust gas flow 40. Exposure to the high temperature exhaust gas flow 40 may cause large dimensional changes during operation due to thermal expansions and contractions. Large dimensional changes present challenges for materials and structural configuration of the duct 60.

The example duct system 65 includes features for cooling and controlling temperatures to minimize thermal growth. The duct system 65 includes cooling passages 64 that are associated and/or integrally formed into the duct 60. The cooling passages 64 receive a cooling water flow 80 that accepts heat to maintain the duct 60 within a predefined temperature range. The predefined temperature range is determined to limit dimensional changes generated by thermal expansion and contraction. Moreover, the predefined temperature range is provided to maintain temperature within a range that corresponds with duct material capabilities. Lower and controlled operating temperatures of the duct 60 may enable the use of lower temperature capable material.

Referring to FIGS. 2 and 3 with continued reference to FIG. 1, one example cooling passage 64 is defined within a radial space 76 between an inner duct wall 72 and an outer duct wall 74. The radial space 76 between the inner duct wall 72 and the outer duct wall 74 may be annular about the axis A and the pathway 62 as is shown in FIG. 3. The cooling passage 64 may be fully annular or be comprised of annular sections arranged circumferentially about the axis A. The example passage 64 may also comprise a plurality of axially extending passages disposed about the periphery of the duct 60. In one example, the cooling passage 64 extends axially parallel to the exhaust gas flow 40.

The example duct 60 may be generally circular in cross-section, however other symmetric or non-symmetric shapes could be utilized and are within the contemplation of this disclosure. Additionally, although the example duct 60 is shown as arranged along the engine axis A, the duct 60 may be arranged non-concentric to the axis A to correspond with non-symmetric, non-concentric and non-axial flow paths for communicating exhaust gas flows 40 to the evaporator system 42.

The cooling passage 64 includes an inlet 66 for the cooling water flow 80 and an outlet 68 configured to exhaust a heated water flow 82. The heated water flow 82 is communicated to an inlet 84 of the evaporator 42. The heated water flow 82 provides for recovery of heat energy by aiding in heating the water within the evaporator system 42 to generate the steam flow 48. As appreciated, the hotter the water entering the evaporator system 42, the less additional thermal energy that is needed to be applied in the evaporator system 42 to generate the steam flow 48. Reduction in the amount of thermal energy needed to be input to vaporize water can enable more efficient and cost-effective evaporator configurations. Moreover, additional recovery of heat energy may positively change overall engine efficiencies.

In one example embodiment, the inlet 66 is disposed downstream of the outlet 68 such that the cooling water flow 80 flows in a direction counter to the direction of the exhaust gas flow 40. The opposing flow directions of the cooling water flow 80 and the exhaust gas flow 40 may provide advantageous thermal transfer for the duct 60.

A control valve 56 is provided to control cooling water flow 80 into the cooling passage 64. A controller 70 is provided and programmed to operate the control valve 56 based on the temperature information provided by at least one temperature sensor that is schematically indicated at 58. The control valve 56 may provide proportional control of water flow to proportion the cooling water flow 80 to maintain and control the temperature of the duct 60. Moreover, the control valve 56 may be controlled in view of operation of the evaporator system 42. The temperature of the heated water flow 82 to the evaporator system 42 can be controlled by operation of the control valve 56 to tailor operation to current operating conditions. The control valve 56 is shown schematically and can be one valve or a system of valves that provide control of the cooling water flow 80.

Although the controller 70 is disclosed by way of example as programmed to operate the control valve 56 based on information from the temperature sensor 58 other engine operating information could be utilized as the basis for operation of the control valve 56. The operating information can include monitored engine parameters such as shaft speeds, pressures, temperatures within the propulsion system 20 and information indicative of ambient conditions.

The example controller 70 is a device and system for performing necessary computing or calculation operations. The example controller 70 may be specially constructed for this purpose, or it may comprise at least a general-purpose computer selectively activated or reconfigured by a computer program stored in the computer. The controller 70 may further be a dedicated controller, or may be a program stored on an engine or aircraft controller.

The controller 70 may include a computer program directing operation. Such a computer program and also data required for its execution may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Furthermore, the computer referred to may include a single processor or may be architectures employing multiple processor designs for increased computing capability.

In one operational embodiment, gas flow 40 through the evaporator system 42 generates steam flow 48 that is injected into the combustor 28. As heat in the gas flow 40 is used to generate steam, it cools and is communicated to the condenser 44. In the condenser 44, the gas flow is further cooled by rejecting heat to the cooling fuel flow 38 or the ram air flow 86. The gas flow 40 is cooled to the point where liquid water condenses, is separated in the water separator 50 and routed to the water tank 52. The remaining gas flow is exhausted to the ambient environment.

Water from the tank 52 is pressurized by the water pump 56 and communicated as the cooling flow 80 through the cooling passage 64 of the duct 60. The cooling water flow 80 accepts heat 78 to maintain the duct 60 within a predefined temperature range. Although some cooling of the exhaust gas flow 40 may occur, the example cooling flow 80 is concentrated on maintaining the duct 60 within the predefined temperature range to limit dimensional changes during operation. The amount of cooling water flow 80 is controlled by the controller 70 through operation of the control valve 56. During initial engine startup, the duct 60 may not require as much cooling flow as during full power engine operation. In the disclosed example embodiment, water is provided as an intercooling flow 88 to the compressor section 26. Control of the intercooling water flow 88 may be provided based on other operational criteria.

The heated water flow 82 exhausted from the cooling passage 64 is routed to the evaporator system 42 where additional heat is added to generate the steam flow 48. Accordingly, the thermal energy absorbed by the water is recovered by reducing the amount of additional heat required to generate the steam flow 48 in the evaporator system 42.

Figures 4, 5:
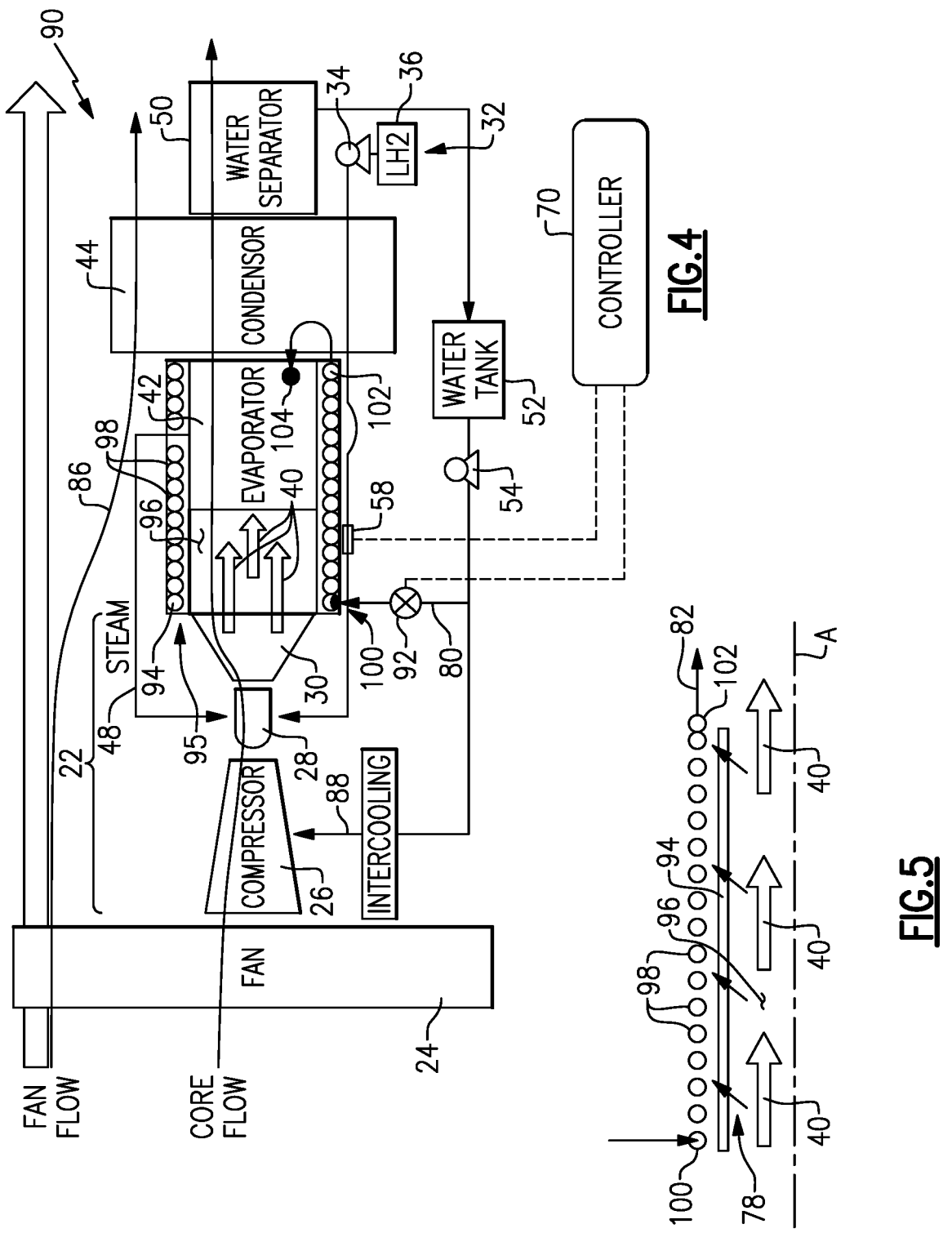
FIG. 4 is a schematic view of another example aircraft propulsion system embodiment.
FIG. 5 is a schematic cross-section of a portion of another example cooling flow passage within an exhaust gas flow duct.

Referring to FIGS. 4 and 5, another example propulsion system 90 is schematically shown and includes a duct system 95 with a duct 94 defining a pathway 96 for the exhaust gas flow 40 and a plurality of cooling conduits 98 for the cooling water flow 80. The cooling conduits 98 are disposed about a periphery of the duct 94 and are arranged such that the cooling water flow 80 flows in a direction transverse to the exhaust gas flow 40. The plurality of conduits 98 may spirally wind around the duct 94 between an inlet 100 and an outlet 102. In the example embodiment shown in FIGS. 4 and 5, the inlet 100 is upstream of the outlet 102 such that the cooling flow 80 flows through the conduits 98 in a general axial direction that is the same as that of the exhaust gas flow 40. Cooling water flow 80 entering through the inlet 100 spirals around the duct 94 radially and axially toward the outlet 102. At the outlet 102, the heated water flow 82 is exhausted and communicated to an inlet 104 of the evaporator system 42.

The example conduits 98 may be of any size, shape and number that is determined to provide the desired cooling of the duct 94. Although the example conduits 98 are shown by way of example as being substantially round, other shapes could be utilized. Moreover, the example conduits 98 are separate from the duct 94 but are in thermal contact to transfer thermal energy into the cooling water flow 80. The conduits 98 may be integral to the duct 94 and remain within the contemplation and scope of this disclosure.

A control valve 92 provides for control of the cooling water flow 80 that is provided into the conduits 98. A temperature sensor 58 provides temperature information to the controller 70 that is utilized to determine operation of the control valve 92. The controller 70 may control operation of the control valve 92 based on other engine operating criteria within the contemplation and scope of this disclosure.

Figure 6:
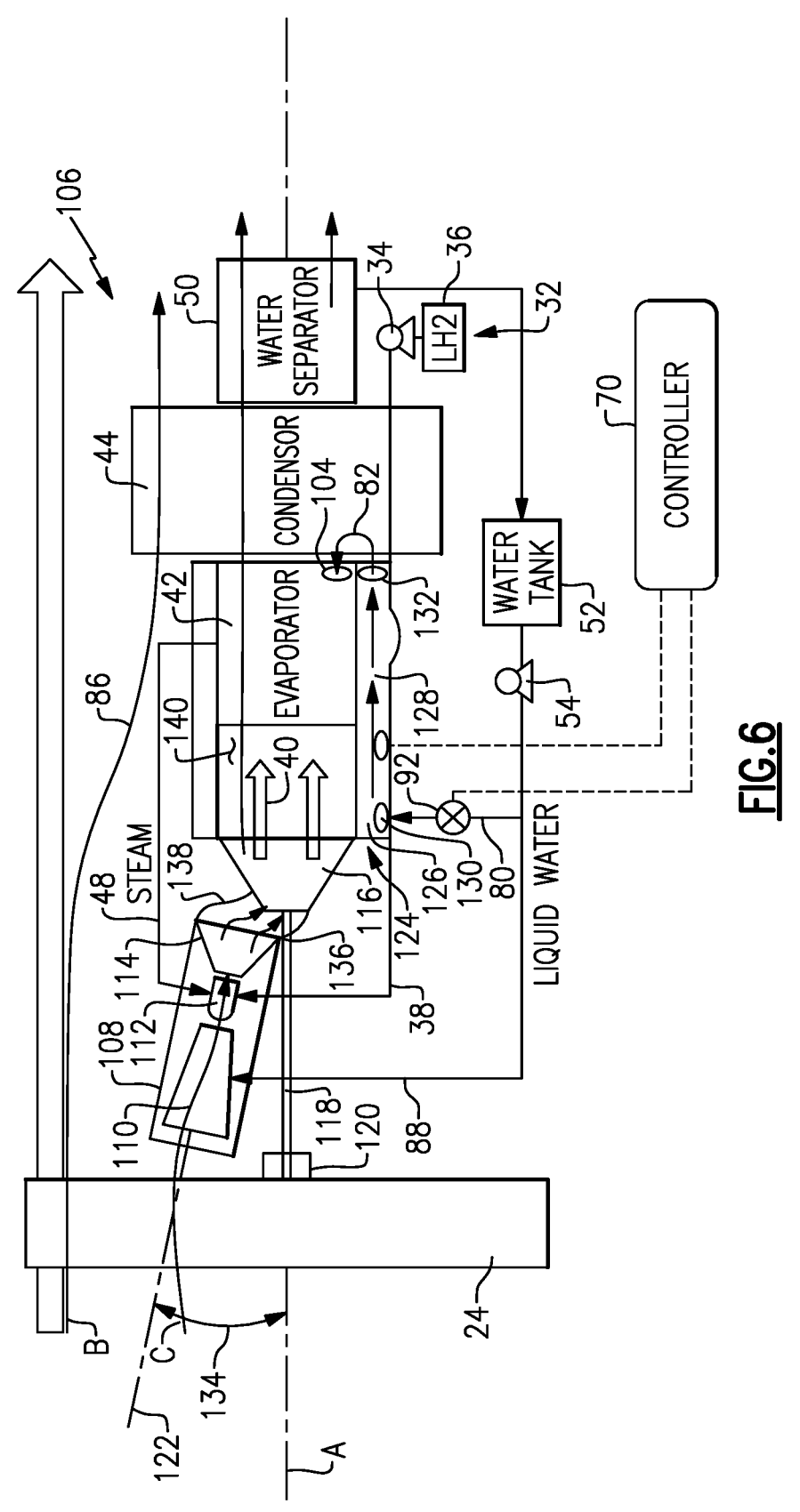
FIG. 6 is a schematic view of another example aircraft propulsion system embodiment.

Referring to FIG. 6, another example propulsion system 106 is schematically shown and includes an offset core engine 108. The core engine 108 is disposed along a core engine axis 122 that is offset at an angle 134 relative to the axis A. The example angle 134 is between around 25 degrees and 50 degrees however other angles could be utilized and are within the contemplation and scope of this disclosure. The relatively small size of the core engine 108 is enabled by the additional engine efficiency and power provided by steam injection. The small size of the core engine 108 enables the offset inclined orientation. Although the example core engine 108 is orientated toward the top of the propulsion system 106, the core engine 108 may be located and orientated differently and remain within the contemplation and scope of this disclosure.

The core engine 108 includes a compressor section 110, combustor section 112 and a turbine section 114 that provide for the generation of an exhaust gas flow 136. The exhaust gas flow 136 generated in the core engine 108 is communicated through a duct 138 to a power turbine 116. The exhaust gas flow 136 expands through the power turbine 116 to drive shaft 118 coupled to the fan 24 through a gearbox 120.

An exhaust gas flow 40 exiting the power turbine 116 is communicated through the duct system 124 to the evaporator system 42. Operation of the evaporator 42 and condenser 44 is the same as described above with regard to the propulsion system embodiments 20, 90. An example duct system 124 includes a duct 126 defining a pathway 140 for the exhaust gas flow 40 and a cooling passage 128 for the cooling water flow 80. The example cooling passage 128 includes an inlet 130 and an outlet 132. A valve 92 is provided upstream of the inlet 130 to control the amount of cooling water flow 80 communicated into the cooling passage 128. Heated water flow 82 emitted from the outlet 132 is communicated into an inlet 104 of the evaporator system 42. The heated water flow 82 is further heated and transformed into the steam flow 48 that is communicated to the core engine 108. The example cooling passage 128 may be as disclosed above or may be of another configuration determined to place the cooling water flow 80 in thermal communication with the duct 126. Although the duct system 124, evaporator 42 and condenser 44 are shown as being arranged along the engine axis A, other mounting locations may be utilized and are enabled by the offset orientation of the core engine 108.

Accordingly, a cooling passage for a cooling water flow of the disclosed duct systems maintain temperatures within a predefined temperature range that limits thermal expansion and recovers thermal energy that is utilized to aid in the generation of a steam flow.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:

a compressor section where an inlet airflow is compressed;

a combustor section where the compressed inlet airflow is mixed with fuel and ignited to generate an exhaust gas flow that is communicated through a core flow path;

a turbine section through which the exhaust gas flow expands to generate a mechanical power output;

a condenser where water is extracted from the exhaust gas flow;

an evaporator system where thermal energy from the exhaust gas flow is utilized to generate a steam flow from at least a portion of water extracted by the condenser for injection into the core flow path; and a duct system including a duct defining a pathway for the exhaust gas flow between the turbine section and the evaporator system and a cooling passage for a flow of water that accepts heat from the exhaust gas flow to cool the duct, wherein the evaporator system is disposed within the duct system;

a control valve configured to control the flow of water into the cooling passage;

a temperature sensor configured to monitor a temperature of the duct; and a controller programmed to control a temperature of the duct between the turbine section and the evaporator system by transferring heat from the exhaust gas flow into the flow of water through the cooling passage by operating the control valve to maintain the duct within a predefined temperature range based on information from the temperature sensor.

2. The turbine engine assembly as recited in claim 1, wherein the passage includes an inlet that receives the flow of water from a water source and an outlet for communicating a heated water flow from the passage to the evaporator system.

3. The turbine engine assembly as recited in claim 2, wherein the inlet and the outlet of the cooling passage is arranged such that the flow of water flows counter to the exhaust gas flow between the turbine section and the evaporator system.

4. The turbine engine assembly as recited in claim 1, wherein the duct includes an inner wall spaced radially apart from an outer wall and the cooling passage is at least partially defined within a radial space between the inner wall and the outer wall.

5. The turbine engine assembly as recited in claim 1, wherein the passage comprises at least one conduit in thermal contact with the duct.

6. The turbine engine assembly as recited in claim 1, wherein the pathway defined by the duct extends between the turbine section and the evaporator system.

7. The turbine engine assembly as recited in claim 1, further including a fuel system configured to provide a non-carbon-based fuel to the combustor section.

8. The turbine engine assembly as recited in claim 1, further including an intercooling system where a flow of water is utilized for cooling a portion of the compressed inlet flow.

9. An aircraft propulsion system comprising:
a core engine section defining a core flow path where an inlet airflow is compressed, mixed with fuel, and ignited to generate an exhaust gas flow that is communicated through the core flow path;
a condenser where water is extracted from the exhaust gas flow;
an evaporator system where thermal energy from the exhaust gas flow is utilized to generate a steam flow for injection into the core flow path;
a duct system including a duct defining a pathway for the exhaust gas flow between the core engine section and the evaporator system and a cooling passage for a flow of water that accepts heat from the exhaust gas flow to cool the duct, wherein the cooling passage includes an inlet that receives the flow of water from a water source and an outlet for communicating a heated water flow to the evaporator system, wherein both the evaporator system is disposed within the duct system;
a control valve configured to control the flow of water into the cooling passage; and a temperature sensor configured to monitor a temperature of the duct between a turbine section of the core engine section and the evaporator system; and
a controller programmed to control a temperature of the duct between the core engine section and the evaporator system by transferring heat from the exhaust gas flow into the flow of water through the cooling passage by operating the control valve to maintain the duct within a predefined temperature range based on information from the temperature sensor.

10. The aircraft propulsion system as recited in claim 9, wherein the duct includes an inner wall spaced radially apart from an outer wall and the cooling passage is at least partially defined within a radial space between the inner wall and the outer wall.

11. The aircraft propulsion system as recited in claim 9, wherein the cooling passage comprises at least one conduit in thermal contact with the duct.

12. The aircraft propulsion system as recited in claim 9, wherein the inlet and the outlet of the cooling passage is arranged such that the flow of water flows counter to the exhaust gas flow between the core engine section and the evaporator system.

13. The aircraft propulsion system as recited in claim 9, further including a fuel system configured to provide a non-carbon-based fuel to the core engine section.

14. A method of operating a gas turbine engine, the method comprising:
generating an exhaust gas flow that is communicated through a core flow path;
expanding the gas flow through a turbine section to generate a mechanical power output;
routing the exhaust gas flow through a duct defining a pathway for the exhaust gas flow between the turbine section and an evaporator system;
extracting water from the exhaust gas flow in a condenser;
monitoring a temperature of the duct;
controlling a temperature of the duct between the turbine section and the evaporator system by transferring heat from the exhaust gas flow into a flow of water in thermal communication with the duct to generate a heated flow of water, wherein controlling the temperature comprises controlling the flow of water through a cooling passage in thermal communication with the duct to maintain the duct within a predefined temperature range; and
generating a steam flow by vaporizing the heating flow of water with heat from the exhaust gas flow in the evaporator system.

15. The method as recited in claim 14, further comprising directing the flow of water through the cooling passage in a direction that is counter to a direction of the exhaust gas flow.

* * * * *